US008774183B2

(12) United States Patent
Kitamura et al.

(10) Patent No.: US 8,774,183 B2
(45) Date of Patent: Jul. 8, 2014

(54) RELAY DEVICE AND METHOD FOR CONNECTING CLIENT APPARATUS WITH SERVER

(75) Inventors: Jun Kitamura, Tokyo (JP); Shinpei Yashima, Tokyo (JP); Atsuki Ishida, Tokyo (JP)

(73) Assignee: Freebit Co., Ltd., Tokyo (JP)

( * ) Notice: Subject to any disclaimer, the term of this patent is extended or adjusted under 35 U.S.C. 154(b) by 336 days.

(21) Appl. No.: 12/096,584

(22) PCT Filed: Dec. 8, 2006

(86) PCT No.: PCT/JP2006/324527
§ 371 (c)(1),
(2), (4) Date: Sep. 17, 2009

(87) PCT Pub. No.: WO2007/066752
PCT Pub. Date: Jun. 14, 2007

(65) Prior Publication Data
US 2010/0054250 A1    Mar. 4, 2010

(30) Foreign Application Priority Data
Dec. 8, 2005    (JP) ................................ 2005-354886

(51) Int. Cl.
*H04L 12/56*    (2011.01)
*H04L 12/46*    (2006.01)

(52) U.S. Cl.
USPC ........................................... 370/392; 370/411

(58) Field of Classification Search
None
See application file for complete search history.

(56) References Cited

U.S. PATENT DOCUMENTS 6,154,839 A    11/2000 Arrow et al.
(Continued)

FOREIGN PATENT DOCUMENTS

EP    1575230 A1 *    9/2005
JP    2001-274845    10/2001
(Continued)

OTHER PUBLICATIONS

"Keitai Denwa de Seigyo suru Home Security Layer 2VPN Gijutsu no Kumikomi de Jitsugen," Nikkei Communications, Sep. 15, 2005, vol. 446, p. 114.
(Continued)

*Primary Examiner* — Gregory Sefcheck
*Assistant Examiner* — Steve Young
(74) *Attorney, Agent, or Firm* — Baker & Hostetler LLP (57) ABSTRACT

A simple means is used to realize a virtual network communication via an home network and Internet. A relay device 4 comprises bridge module 12 provided between a network protocol stack 13 and each of network devices 10, 11 for bridging for packets which are not addressed to the relay device or VLAN, or not broadcast request packets; a server address storage section 17 for storing the global address of a server; a tunneling session establishing section 20 for establishing a tunneling connection with the server based on the global address; a capsulating processing section 21 for capsulating a originating address and sending it to the server via the tunneling connection; and a virtual IP address/private IP address conversion section 22 for decapsulating a packet addressed to the relay device, converting a destination virtual network address included in this packet to a private IP address on the LAN of a client apparatus, and sending it onto the LAN via the bridge module.

19 Claims, 3 Drawing Sheets

(56) References Cited

U.S. PATENT DOCUMENTS

| | | | |
|---|---|---|---|
| 6,226,748 B1* | 5/2001 | Bots et al. | 726/15 |
| 7,934,014 B2* | 4/2011 | Ishida et al. | 709/238 |
| 2001/0017857 A1* | 8/2001 | Matsukawa | 370/392 |
| 2006/0075080 A1* | 4/2006 | Burr et al. | 709/223 |
| 2007/0086449 A1* | 4/2007 | Huang et al. | 370/389 |

FOREIGN PATENT DOCUMENTS

| | | |
|---|---|---|
| WO | 01/71977 A2 | 9/2001 |
| WO | 01/71977 A3 | 9/2001 |
| WO | WO2004/051948 * | 5/2004 |

OTHER PUBLICATIONS

"APS Service Dokodemo LAN' a Tsukau," Network Magazine, 2005 Nen, 1 Gatsugo, vol. 10, No. 1, Jan. 2005, p. 86-87.

"International Search Report," dated Jan. 2007.

M. Borella et al., "Realm Specific IP: Framework", IETF Standard, Internet Engineering Task Force, CH, Oct. 1, 2001.

Bjorn Landfeldt et al., "Expanding the Address space through REBEKAH-IP: An Architectural View", ICITA. International Conference on Information Technology and Appplications, Nov. 25, 2002, pp. 49-54.

Supplementary European Search Report for EP Application No. 06 83 4282, dated Apr. 5, 2011.

* cited by examiner

RELAY DEVICE AND METHOD FOR CONNECTING CLIENT APPARATUS WITH SERVER

CROSS REFERENCE TO RELATED APPLICATIONS

This application is the National Stage of International Application No. PCT/JP2006/324527, filed on Dec. 8, 2006, which claims priority under 35 U.S.C. 119 of Japanese Patent Application Serial No. 2005-354886, filed on Dec. 8, 2005 the disclosures of which are incorporated herein by reference in their entirety.

FIELD OF THE INVENTION

This invention relates to a relay device and a method for connecting a client apparatus and a server which enable bidirectional communications among terminals belonging to different LANs via Internet in a highly secure manner by relatively simple means under a current infrastructure environment widely employing the IPv4 (Internet Protocol version 4).

BACKGROUND OF THE INVENTION

In a service delivery environment through public networks centered around the Internet, values of all information are generally concentrated on a server side rather than a client side.

In other words, each client (terminal device) is basically a mere viewer browsing information on the Internet. Each client issues requests for various information to the Internet, which in return may obtain such information for the client. It means that all information is collected on the Internet and it only offers formulaic information unidirectionally. For this reason, it is difficult for manufacturers of client terminal devices to create an added value.

In order to change such a circumstance, the server-client relationship must be reversed by inverting the access direction. That is, when there is a home network connected to the Internet, it is necessary to create an environment for allowing the Internet to access the home network to receive a service therefrom.

To achieve this, each apparatus connected to the home network must be uniquely identifiable from the Internet, and intra-home routing and security problems must be solved. One of the technologies to address this issue is the IPv6 (Internet Protocol version 6).

However, considering the environment surrounding the current carriers and Internet service providers in Japan, it may be considerably long before IPv6 becomes widespread. For example, the currently used IPv4 machines need at least 2 to 3 years for their depreciation and IPv6 service is offered on a test basis only.

In order to immediately achieve an IPv6-enabled network, manufacturers must expand their business to ISP level services, which is very costly and unrealistic for most of them. Since existing home networks vary broadly in their structures and also in connection mechanisms depending on the carrier and ISP, there is a need for a mechanism for absorbing all these differences to achieve the IPv6 environment with a standardized approach.

The Japanese Unexamined Patent Application Publication No. 2001-274845 (JP-A-2001-274845) discloses pertinent prior art, although it does not contradict with novelty and inventive step of the present invention.

In the conventional IPv4 environment, the following problems arise in an attempt to achieve such bidirectional accesses as would be possible in IPv6 networks between the home network and the Internet.

For example, when installing a network home appliance at home in the current IPv4 environment, the appliance should be connected to a router connected to the Internet through the home network. Accordingly, an IP address of the network home appliance becomes a private address and cannot be accessed from non-home network.

Thus an access to the network home appliance has been conventionally achieved by employing a dedicated router capable of controlling the network home appliance, or by first accumulating information for controlling the home network appliance at a data center provided on the Internet and then retrieving the information by performing polling from the network home appliance.

However, such a dedicated router decreases the system's versatility and increases the cost. When retrieving the control information by polling, real time accesses cannot be made and the network and server load increases.

In order to overcome these challenges, a network connection method and a relay device were disclosed by the present assignee in International Application PCT/JP 2005/9280, filed on May 20, 2005, the disclosure of which is incorporated herein by reference. This invention enables bidirectional communications between the home network and the Internet by relatively simple means by establishing a tunneling connection session between a computer system in a private network and an InterServer on the Internet.

However, the relay device disclosed in the above application mainly operates as a router or is installed in the form of a virtual device driver and a program in each client apparatus and therefore further improvement may be possible. That is, there can be provided means for operating as a non-router and establishing a connection similar to one in the above disclosure even on networks connected with apparatuses such as printers, cameras, and scanners in which said means cannot be installed as a virtual device driver and the like.

Considering the above situation, the purpose of the present invention is to provide an Internet connection system for enabling virtual network communications via the home network and the Internet by relatively simple means without having to switch routers in a private network environment connected to apparatuses with no virtual device driver installable.

SUMMARY OF THE INVENTION

In order to achieve the above object, according to a principal aspect of the present invention, there is provided a relay device disposed upstream of a client apparatus on a LAN for connecting the client apparatus with a virtual network via a server on the Internet, comprising:

a bridge module provided between a local communication protocol stack and a network device for bridging between upstream and downstream of the LAN to let packets pass through without passing the packets to the local communication protocol stack unless the packets are addressed to the relay device itself, for broadcasting or a request packet addressed to the virtual network;

a server address storage section for storing a global address of a server on the Internet; a tunneling connection establishing section for establishing a tunneling connection between the relay device and the server based on the global address of the server;

a capsulating processing section for receiving a request packet that includes a virtual network address of the virtual network originating from the client apparatus, captured by the bridge module, capsulating the packet after adding to the packet the virtual network address of the client apparatus as an originating address, and sending the capsulated packet to the server via the tunneling connection; and a decapsulating processing section for decapsulating a packet addressed to the relay device itself received through the local communication protocol stack via the tunneling connection, converting a destination virtual network address included in the decapsulated packet into a private IP address of the client apparatus on the LAN, and sending the packet to the client apparatus by the bridge module.

According to such a structure, a client apparatus on the LAN and another client apparatus on another particular LAN can be connected bi-directionally through the virtual network via the server. According to the present invention, installing this relay device enables LAN elements such as the above client apparatus and a router to communicate with each other on the virtual network without making any changes.

Also this relay device captures a packet only if the packet includes the virtual network address and simply bridges (transmits) other packets (including broadcasts), thereby allowing apparatuses located downstream and upstream of this relay device in the network to communicate seamlessly as apparatuses on the same LAN, and also allowing the downstream apparatuses to connect with the Internet via the router in the upstream.

The features described above allow apparatuses, such as printers and webcams in which virtual network drivers cannot be installed, to participate in the virtual network without installing a virtual network driver and without compromising the preexisting LAN environment. In other words, the relay device operates simply by being disposed in the place of one cable of wiring on a LAN network.

According to one preferable embodiment, the relay device connects to a tunneling mediation server provided on the Internet and receives the global address of the server from the tunneling mediation server.

Also, according to one embodiment, the relay device receives from the server the virtual network address assigned to the client apparatus and stores the virtual network address in association with the private IP address of the client apparatus. In this case, this relay device preferably comprises a downstream client apparatus detecting section for detecting the private IP address and a MAC address of the client apparatus by monitoring all packets arriving at a network device located downstream of the LAN. Furthermore, the downstream client apparatus detecting section preferably comprises a function to send a broadcast response request to the LAN downstream on a regular or arbitrary basis and facilitate a response from the client apparatus.

According to another preferable embodiment, the client apparatus is a network-enabled home appliance including a home appliance in which a user cannot install a virtual network driver and the like. The client device may include a peripheral device communicable with the relay device but unable to connect to the Internet by itself.

Moreover, according to another principal aspect of the present invention, there is provided a method for connecting a client apparatus and a server, wherein the method is performed in an Internet-connected environment, wherein the Internet-connected environment comprises a client apparatus on a LAN, a relay device connected upstream of the client apparatus on the LAN, and a server to which the client apparatus is connected via the Internet, the method comprising the steps of:

(a) by the relay device, receiving and storing a global IP address of the server;

(b) by the relay device, establishing a TCP/IP session with a tunneling connection between the relay device and the server using the received global IP address;

(c) by the relay device, assigning a virtual network IP address to the client apparatus, receiving a packet addressed to the virtual network IP address from the server via the tunneling connection, rewriting the destination virtual network IP address with a private IP address of the client apparatus on the LAN, and sending the packet to the LAN downstream; and (d) by the relay device, capturing a packet including the virtual network IP address from the client apparatus, and sending the packet to the server with the tunneling connection.

In this case, the relay device is disposed on the LAN to which the client apparatus belongs, and the packet is simply passed through the LAN without performing the steps (c) and (d) unless the packet is addressed to the relay device, for broadcasting or a request packet destined for the virtual IP network address.

According to one preferable embodiment, this method further comprises the step of notifying, by the server, the relay device of the virtual network IP address of the client apparatus. Also according to one preferable embodiment, this method further comprises the step of connecting, by the relay device, to a tunneling mediation server provided on the Internet and receiving the global address of the server from the tunneling mediation server.

According to still another preferable embodiment, this method further comprises the step of receiving, by the relay device, from the server the virtual network address assigned to the client apparatus and storing the virtual network address in association with the private IP address of the client apparatus. In this case, the above method further comprises the step of detecting, by the relay device, the private IP address and a MAC address of the client apparatus by monitoring all packets arriving at a network device located downstream of the LAN, wherein the relay device preferably comprises a function to send a broadcast response request to the LAN downstream on a regular or arbitrary basis and facilitate a response from the client apparatus.

It should be noted that other characteristics and marked effects of the present invention will be appreciated to those skilled in the art upon referring to the following detailed description of the preferred embodiments and the accompanying drawings.

DETAILED DESCRIPTION OF THE PREFERRED EMBODIMENTS

One embodiment of the present invention will be described below in accordance with accompanying drawings.

Figure 1:
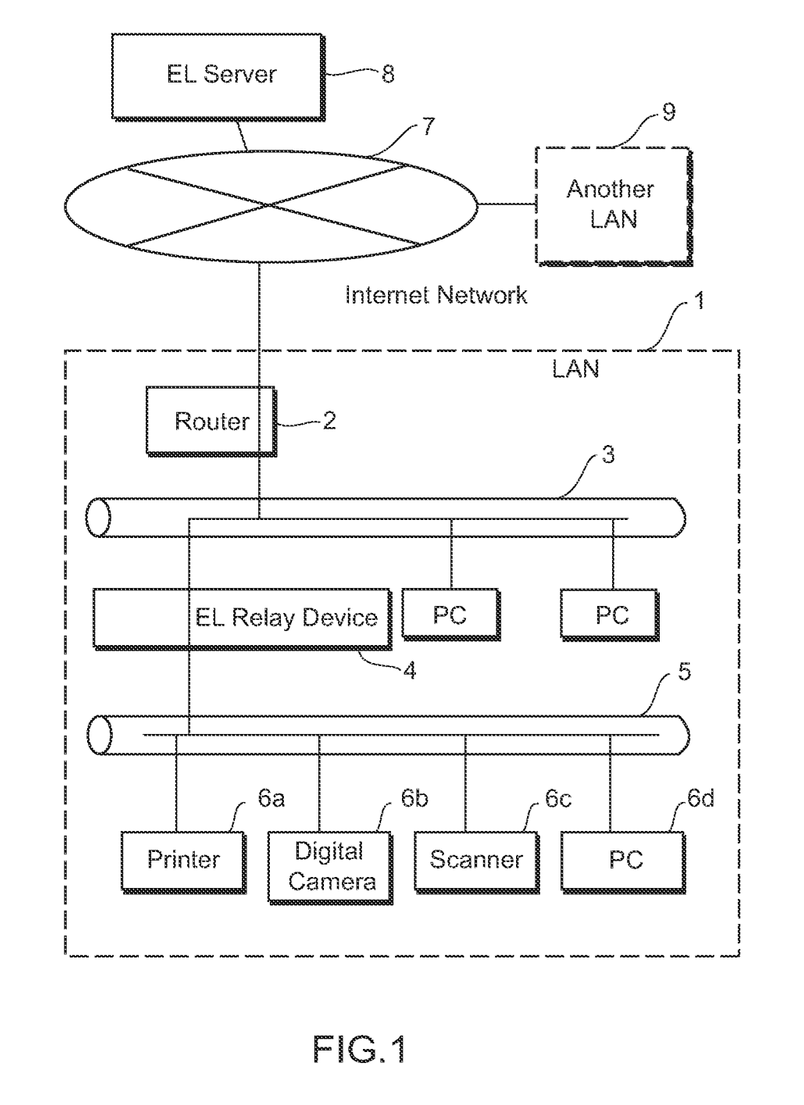
FIG. 1 is a diagram showing an example network structure according to one embodiment of the present invention.

FIG. 1 is a diagram showing an example of network structure according to this embodiment.

Indicated with a reference numeral 1 in this figure is a LAN defined by a connection with various client apparatus (PC, camera, printer, scanner) communicating with IPv4 (a first communication protocol).

This LAN 1 consists of a router 2 which acts as a gateway, an upstream Ethernet® 3 connected to the router 2, a relay device 4 connected downstream of the upstream Ethernet® 3, and a downstream Ethernet® 5 connected downstream of the relay device 4. Connected to the downstream Ethernet® 5 are various client apparatuses 6a-6d for each of which a connection to a virtual network is desired. Such client apparatuses included a printer 6a, a camera 6b, and a scanner 6c, respectively capable of a network connection. Also included is a PC 6d, with no virtual device installed such as the one disclosed in the PCT application referenced above.

In other words, no function for enabling a virtual network connection is installed in any of the client apparatuses 6a-6d.

Thus this LAN 1 is structured in a typical manner which can be seen in a workplace or a home except that the relay device 4 is disposed simply on the upstream side of the Ethernet® 5 connected to the client apparatuses 6a-6d, that is, between the Ethernet® 5 and the router 2.

Therefore, each of the client apparatuses 6a-6d is capable of connecting with the Internet via the router 2 and a communication carrier/ISP (Internet service provider) (not shown), and adapted to communicate with various computers on the Internet 7 with IPv4.

Connected on this Internet 7 is an EL server 8 for controlling communications on the virtual network (a "server" of the present invention, which corresponds with the InterServer of the referenced PCT application, and which comprises a similar structure to that of the InterServer, wherein "EL" is an identification code created by the present inventors). As will be discussed in detail below, this EL server 8 comprises functions for mediating bidirectional communications via a virtual network between the client apparatuses 6a-6d on this LAN1 and client apparatuses (not shown) on another LAN 9, and all bidirectional communications between the Internet 7 and each of the client apparatuses 6a-6d.

Here, the relay device 4 and the EL server 8 are intended to be made by the same manufacturer or under one standard, and are designed to interface with each other. The relay device 4 is provided with a private/global address for the virtual network connection by the EL server 8 as described below so that a TCP/IP session with a tunneling connection may be established at the EL server 8 to enable communications regardless of its carrier or ISP. Also this relay device 4 is adapted to store addresses for the virtual network connection for client apparatuses assigned by the EL server 8.

Note that if the addresses for the client apparatuses 6a-6d can be uniquely generated at any given time, those addresses may be generated by the relay device 4.

In addition if the client apparatuses 6a-6d are home appliances such as a television or video cassette recorder (VCR) unable to connect with the Internet, the relay device 4 and its client apparatuses may be connected through a predetermined communication interface (IEEE1394) and each client apparatus may be assigned with a virtual IP address.

Figure 2:
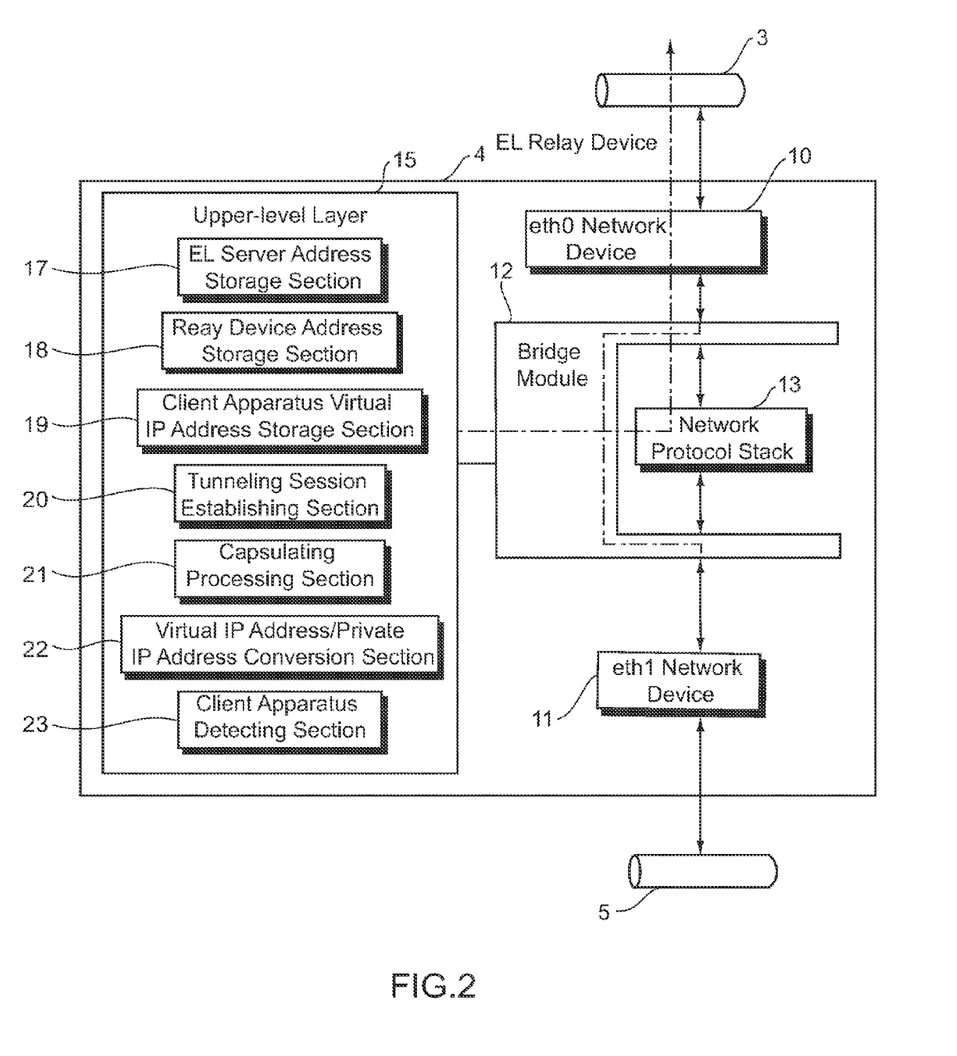
FIG. 2 is a schematic structural view showing an example relay device according to one embodiment of the present invention.

FIG. 2 is a schematic structural view showing the relay device 4.

In this embodiment, Linux (product name) is installed as an operating system in the relay device 4.

Indicated by 10, 11 in the figure are Ethernet® devices as communication interfaces for sending and receiving packets. Here, eth0 and eth1 are connected to the upstream network 3 and the downstream network 5, respectively.

Also indicated by 12 in this figure is an EL bridge module (a bridge module of the present invention). This bridge module 12 is incorporated into the Linux kernel and it receives packets before a network protocol stack 13 does, which receives the packets to interpret and send them to a predetermined location.

The bridge module 12 performs the following:

(1) Upon receipt of an Ethernet® packet from eth0:

If the packet is not in an IP format, it simply bridges and sends the packet to eth1 (see the path indicated by a dashed-dotted line).

If the destination IP address of the packet is unrelated to the address of the relay device 4 itself, it bridges and sends the packet to eth1.

If the destination IP address is of the relay device 4 itself, it passes the packet to the network protocol stack 13.

If the packet is for broadcasting, it duplicates the packet and sends one of the duplicated packet to eth1 and passes the other packet to the network protocol stack 13. Thus this bridge module 12 passes a broadcast packet, while receiving it for the bridge module itself.

(2) Upon receipt of an Ethernet® packet from eth1:

If the packet is not in the IP format, the bridge module 12 simply sends the packet to eth0.

If the destination IP address of the packet is of the virtual network, it notifies an upper-level layer 15 of the packet receipt and stores its content.

If the destination IP address is the address of the relay device 4 itself, it passes the packet to the network protocol stack 13.

If the packet is for broadcasting, it duplicates the packet and sends one of the duplicated packets to eth0 and passes the other packet to the network protocol stack 13. Thus this bridge module 12 allows a broadcast packet to pass through, while receiving it for the bridge module itself.

(3) If a packet is passed from the upper-level layer 15, the bridge module 12 sends the packet to eth1 without checking the packet content.

(4) If a request is sent from the upper-level layer 15, the bridge module 12 passes the stored packet destined for the virtual network address to the upper-level layer 15.

(5) If the bridge module 12 has a list containing the MAC addresses and corresponding IP addresses included in the received packets from eth1, and if a request is received from the upper-level layer, the bridge module 12 passes the list to the upper-level layer.

The upper-level layer 15 has a server address storage section 17 for storing the global address of the EL server in IPv4 as a program or storage area; a relay device address storage section 18 for storing a private address (virtual IP address) assigned to the relay device 4; a client apparatus virtual IP address storage section 19 for storing (one or more) virtual IP addresses for client apparatuses assigned by the EL server 8 in order to configure a virtual private network; a tunneling session (connection) establishing section 20 for establishing a tunneling connection with the EL server 8 based on the address of the EL server 8; a capsulating processing section 21 for capsulating/decapsulating IPv4/IPv6 packets in IPv4 and performing tunneling transmissions with the EL server 8; a virtual IP address/private IP address conversion section 22 for converting between the virtual IP addresses of the client apparatuses 6a-6d and private IP addresses on the LAN, respectively; and a client apparatus detecting section 23 for detecting the private IP addresses and MAC addresses of the client apparatuses 6a-6d located in the downstream of the LAN. Packets transmitted to and from the EL server 8 are passed to and from the EL bridge module 12/network protocol stack 13 through the virtual IP address/private IP address conversion section 22.

According to such a structure, the bridge module 12 has a data portal to and from a network protocol stack of a Linux kernel to allow packet transmission without using the Linux network functions.

Since packet transfer between eth0 and eth1 performed based solely on the included address, the relay device does not concern whether or not the transmitted packet content is damaged. Accordingly, in a typical network this relay device 4 usually becomes an element (bridge) which functions exactly the same way as a cable does.

Also since the relay device 4 sends a packet in response to a request from the upper-level layer 15 without checking the packet content, it can send a packet not originated from itself. In creating packets which do not pass through the network protocol stack 13, however, the upper-level layer 15 is solely responsible for the packet compliance with standards.

In addition, this bridge module 12 maintains the list of the IP addresses of the packets received at eth1, and their MAC addresses to therefore enable detection of respective addresses of the apparatuses 6a-6d connected to the downstream network 5

Having functions to store packets which satisfy specified conditions and to notify the upper-level layer 15 of the receipt of those packets, the bridge module 12 is capable of configuring the virtual network by capturing the packets sent thereto. Because of this function, any apparatus connected downstream of the bridge module 12 can participate in a virtual network without notification of its own existence or special configuration unlike with conventional VLAN routers.

Also downstream and upstream apparatuses may be seamlessly used as ones on the same LAN since they allow broadcasts to pass through.

Equipped with features described above, the relay device 4 has a benefit to allow apparatuses, such as printers and webcams in which virtual network drivers cannot be installed, to participate in the virtual network without any configuration, while leaving the preexisting LAN environment uncompromised.

Here, the term "tunneling" used hereinabove refers to technologies for connecting between IPv4 and/or IPv6 networks (routers) via an IPv4 network, and more specifically refers to technologies for tunneling to terminate apparatuses belonging to different networks with a virtual network (VPN: virtual private network). Further in this embodiment, IPv4 packets transmitted among devices are capsulated with IPv4.

Although the above embodiment is described to bridge only for IP protocols, it should be noted that embodiments of the present invention may be configured to pass through IP address for AppleTalk or the like which operates on the Ethernet.

In practice, each of the above-described components of the relay device 4 is composed of, for example, a certain area reserved on a memory such as a RAM or a ROM on a hard disk and the like disposed in a computer system and computer software programs installed therein; and a CPU, a temporary storage device and other peripheral devices such as an I/O device for controlling the memory to read the programs. Although programs such as an OS (operating system) is not shown in this figure, each component of the present embodiment may cooperate with an operating system in the real-world environment.

In addition, the EL server 8 is preferably composed of a plurality of computer system connected with one another for load sharing. This is because it is considered typical that a plurality of different virtual networks are accommodated by only one EL server 8.

Below, structure and functions of the relay device 4 will be described in detail with respect to an example communication in FIG. 3.

Figure 3:
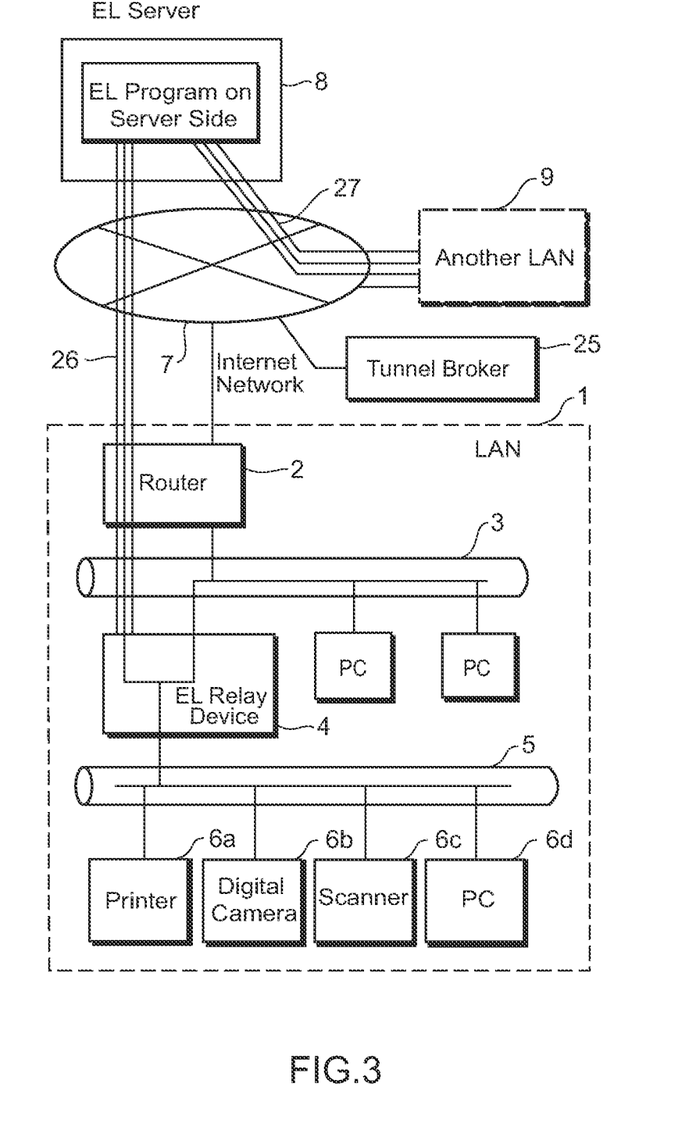
FIG. 3 is a diagram showing an example communication according to one embodiment of the present invention.

FIG. 3 shows client apparatuses 6a-6d connected with the relay device 4 on the LAN 1 and other client apparatuses on another LAN 9 (without limitation), communicating with one another via the EL server 8. It is assumed that the other LAN 9 is provided with a similarly configured relay device to one in the LAN 1.

First, a tunneling session is established between the relay device 4 and the EL server 8.

In this case, the relay device 4 initially connects with a tunnel broker indicated by 25 in the figure using a typical Internet connection method. This tunnel broker 25 selects the EL server 8 from an address database as a tunnel connection destination, and notifies the relay device 4 of an IPv4 address of this EL server 8. This allows the relay device 4 to identify the EL server 8 and, after performing a user authentication, establishes the tunneling session to communicate using virtual IP addresses received from the EL server 8.

In other words, when the relay device 4 connects with the EL server 8, an authentication is performed to establish the connection and the EL server 8 then assigns virtual IP addresses for a particular virtual private network for the relay device 4 based on the authentication. At this time, the EL server 8 also assigns several virtual IP addresses for the client apparatuses 6a-6d, respectively, and these virtual IP addresses are stored in the client apparatus virtual IP address storage section 19.

Also the address conversion section 22 stores a conversion table (conversion rule) for the virtual IP address and its corresponding IP address on the LAN 1 for each of the client apparatuses. In the present embodiment, this conversion table is adapted such that it is automatically created when the client apparatus detecting section 23 detects the client apparatuses. In other words, the bridge module of the relay device is capable of monitoring all downstream packets including broadcast communication of the client apparatuses thereby enabling the client apparatus detecting section 23 to detect the IP addresses on the LAN 1 and the MAC addresses for the client apparatuses. Additionally this client apparatus detecting section 23 has a function to send a broadcast response request (ICMP ECHO) to the LAN downstream on a regular or arbitrary basis and facilitate a response from the client apparatus (ICMP REPLY packet) to thereby ensure detection of the downstream client apparatuses. Note that if such an automatic detection is not used, a user may manually enter IP addresses used in the LAN 1 and also assign the virtual addresses to generate the conversion rule. Also in this case, the present embodiment may be adapted such that the above assignment may be performed automatically and that the user may select either automatic or manual assignment. It should be noted that the IP addresses on the LAN 1 for the client apparatuses are assigned by the router 2.

A path indicated by 26 in FIG. 3 shows that the tunneling session establishing section 20 has established a communication session within a tunneling connection between the EL server 8 and the relay device 4 based on the address of the EL server 8 and virtual IP address assigned to the relay device 4. Similarly, another communication session with a tunneling connection is also established with the other LAN 9 (path 27).

It is assumed that these LAN 1 and LAN 9 belong to the same virtual network (VLAN) and are grouped together.

In this state, a packet to the client apparatuses 6a-6d is sent after being capsulated by the capsulating processing section 21 in an IPv4 packet addressed to the relay device 4. In the relay device 4, when the capsulating processing section 21 decapsulates the packet, the conversion section 22 converts a destination address into the private IP address of the private network and passes it to the bridge module 12. This bridge module 12 simply passes the received packet from eth 0 to its downstream. Thus a connection to client apparatuses 6a-6d on the LAN 1 at home, for example, may be established by an activation from the external server 8 or the other LAN 9.

Communication from the client apparatuses 6a-6d to the virtual network is also sent to virtual IP addresses. When a packet including such a virtual IP address enters the relay device 4 from the downstream device eth 1, this packet is captured by the bridge module 12, capsulated in a packet addressed to the EL server 8 in the upper-level layer 15, and sent to the server 8 with a tunneling connection via the local communication protocol stack and eth0.

According to such a structure, if one of the client apparatuses 6a-6d is a network-enabled home monitoring camera connected to the home LAN, for example, the camera may become directly operable from another network by assigning a virtual IP address to the camera by the relay device 4 and using a virtual network formed between the respective relay devices 4 of the camera's LAN and another network.

The relay device 4 may operated similarly in communications either with the EL server 8 acting as a hub on the virtual network or without a hub such as in PPP connections.

According to the above configuration, all communications with the client apparatuses 6a-6d via the virtual network are performed through the EL server 8 regardless of the carriers and ISP's, enabling the EL server 8 to freely configure and control the client apparatuses 6a-6d in a home or workplace network. Thus all existing problems related to individual identification, in-home routing and security of the network home appliances in the private network by servers on the Internet can be solved, and extremely open and closed networks can be realized.

It is to be understood that the embodiment heretofore described is merely an embodiment of the present invention, and that various changes and modifications can be made without departing from the scope and spirit of the present invention.

For example, although IPv4-over-IPv4 capsulating is employed in the above one embodiment, LAN protocol may also be IPv6. Also the protocol for another LAN may be IPv6. Further, both LANs may each operate on any other protocol.

Although the relay device is disclosed as an independent device in the above one embodiment, it can be installed as software in any computer on the LAN 1.

Still further, it should be understood that the operating system of the relay device is not limited to Linux employed in the above one embodiment.

What is claimed is:

1. A relay device disposed within a LAN for connecting a client apparatus with a virtual network via a server on the Internet, said relay device comprising:
    a server address storage section for storing a global address of said server on the Internet;
    a tunneling connection establishing section for establishing a tunneling connection between said relay device and said server based on said global address of said server, thereby enabling communication destined to a virtual network address of said virtual network, wherein said relay device is disposed between an upstream network and a downstream network within the same LAN, said upstream network having a client apparatus communicating in a first protocol and said downstream network having a client apparatus communicating in said first protocol and at least one client apparatus communicating in a second protocol wherein said first protocol is an internet protocol version four (IPv4) protocol and said second protocol is non-IPv4 protocol;
    a bridge module provided between a local communication protocol stack and a network device for determining a destination of a packet received via the network device, and bridging between the upstream network and downstream network of the LAN by letting the packet pass through without passing the packet to the local communication protocol stack unless the packet is addressed to the relay device itself, a broadcast packet, or a request packet addressed to the virtual network, as well as for capturing and forwarding a request packet that is originated from said at least one client apparatus communicating in said second protocol in the downstream network and that is destined to a virtual network address of said virtual network to a capsulating processing section without passing the packet to said local communication protocol stack;
    said capsulating processing section for receiving said request packet and capsulating the packet after adding to the packet a virtual network address of said at least one client apparatus as an originating address, and sending the capsulated packet to said server via the tunneling connection; and
    a decapsulating processing section for decapsulating a packet addressed to the relay device itself received through said local communication protocol stack via the tunneling connection, converting a destination virtual network address included in the decapsulated packet into a private IP address of said at least one client apparatus in the downstream network, and sending the packet to said at least one client apparatus by the bridge module without passing the packet to the said local communication protocol stack;
    wherein said bridge module passes a broadcast packet to said local communication protocol stack and also let the broadcast packet to pass through.

2. The relay device of claim 1, wherein the non-IPv4 protocol is an IPv6 protocol.

3. The relay device of claim 1, wherein
    said relay device connects to a tunneling mediation server provided on the Internet, and receives the global address of said server from said tunneling mediation server.

4. The relay device of claim 1, wherein
    said relay device receives from said server a virtual network address to be assigned to the client apparatus, and stores the virtual network address in association with the private IP address of the client apparatus on the LAN.

5. The relay device of claim 4, further comprising:
    a downstream client apparatus detecting section for detecting the private IP address and a MAC address of said client apparatus by monitoring all packets arriving at a network device located downstream of the LAN.

6. The relay device of claim 5, wherein
    said downstream client apparatus detecting section comprises a function to send a broadcast response request to the LAN downstream on a regular or arbitrary basis and facilitate a response from the client apparatus.

7. The relay device of claim 1, wherein
said client apparatus is a network-enabled home appliance including a home appliance in which a user cannot install a virtual network driver.

8. The relay device of claim 1, wherein
said client device includes a peripheral device communicable with said relay device but unable to connect to the Internet by itself.

9. The relay device of claim 1, wherein
said bridge module passes a broadcast request packet to the network protocol stack and also bridges for the broadcast request packet to pass through.

10. The relay device of claim 1, wherein
the virtual network address of the client apparatus added as the originating address by said capsulating processing section is assigned to the client apparatus by the relay device.

11. A method for connecting a client apparatus with a virtual network via a server on the Internet, wherein the method is performed in an Internet-connected environment, wherein the Internet-connected environment comprises the client apparatus on a LAN, a relay device on the LAN, and a server to which the client apparatus is connected via the Internet, the method comprising the steps of:
 (a) by the relay device, receiving and storing a global IP address of the server, wherein said relay device is disposed between an upstream network and a downstream network within the same LAN, said upstream network having a client apparatus communicating in a first protocol and said downstream network having a client apparatus communicating in said first protocol and at least one client apparatus communicating in a second protocol, wherein said first protocol is an internet protocol version four (IPv4) protocol and said second protocol is non-IPv4 protocol;
 (b) by the relay device, establishing a TCP/IP session with a tunneling connection between the relay device and the server using the received global IP address;
 (c) by the relay device, assigning a virtual network IP address to said at least one client apparatus communicating in said second protocol, receiving a packet addressed to the virtual network IP address of said at least one client apparatus from the server via the tunneling connection, rewriting a destination virtual network IP address with a private IP address of said at least one client apparatus, and sending the packet to the LAN downstream;
 (d) by the relay device, determining a packet it received from the downstream network is addressed to a virtual network IP address of the virtual network, and capturing and sending the packet to the server through the tunneling connection if the packet is destined to the virtual network; and
 (e) by the relay device, determining a packet it received is a packet for broadcasting, duplicates the packet, passing one of the duplicated packet to a local communication protocol stack and also let the other duplicated packet to pass through, if the packet is a packet for broadcasting.

12. The method of claim 11, wherein
a packet is simply passed through the LAN without performing the steps (c) and (d) unless the packet is addressed to the relay device, for broadcasting or a request packet destined to a virtual network IP address.

13. The method of claim 11, further comprising the step of:
by the server, notifying the relay device of the virtual network IP address of the client apparatus.

14. The method of claim 11, further comprising the step of:
by the relay device, connecting to a tunneling mediation server provided on the Internet, and receiving the global address of the server from the tunneling mediation server.

15. The method of claim 11, further comprising the step of:
by the relay device, receiving from the server the virtual network address assigned to the client apparatus, and storing the virtual network address in association with the private IP address of the client apparatus.

16. The method of claim 15, further comprising the step of:
by the relay device, detecting the private IP address and a MAC address of the client apparatus by monitoring all packets arriving at a network device located downstream of the LAN.

17. The method of claim 16, wherein
the relay device comprises a function to send a broadcast response request to the LAN downstream on a regular or arbitrary basis and facilitate a response from the client apparatus.

18. The method of claim 11, wherein
wherein the non-IPv4 protocol is an IPv6 protocol.

19. A relay device disposed within a LAN for connecting a client apparatus with a virtual network via a server on the Internet, said relay device comprising:
 a server address storage section for storing a global address of said server on the Internet;
 a tunneling connection establishing section for establishing a tunneling connection between said relay device and said server based on said global address of said server, thereby enabling communication destined to a virtual network address of said virtual network, wherein said relay device is disposed between an upstream network and a downstream network within the same LAN, said upstream network having a client apparatus communicating in a first protocol and a said downstream network having a client apparatus communicating in said first protocol and at least one client apparatus communicating in a second protocol;
 a bridge module provided between a local communication protocol stack and a network device for determining a destination of a packet received via the network device, and bridging between the upstream network and downstream network of the LAN by letting the packet pass through without passing the packet to the local communication protocol stack unless the packet is addressed to the relay device itself, a broadcast packet, or a request packet addressed to the virtual network, as well as for capturing and forwarding a request packet that is originated from said at least one client apparatus communicating in said second protocol in the downstream network and that is destined to a virtual network address of said virtual network to a capsulating processing section without passing the packet to said local communication protocol stack,
 said capsulating processing section for receiving said request packet and capsulating the packet after adding to the packet a virtual network address of said at least one client apparatus as an originating address, and sending the capsulated packet to said server via the tunneling connection; and
 a decapsulating processing section for decapsulating a packet addressed to the relay device itself received through said local communication protocol stack via the tunneling connection, converting a destination virtual network address included in the decapsulated packet into a private IP address of said at least one client apparatus in the downstream network, and sending the packet to said at least one client apparatus by the bridge module without passing the packet to the said local communication protocol stack,
wherein said bridge module passes a broadcast packet to said local communication protocol stack and also let the broadcast packet to pass through.

* * * * *